United States Patent Office 3,497,152
Patented Feb. 24, 1970

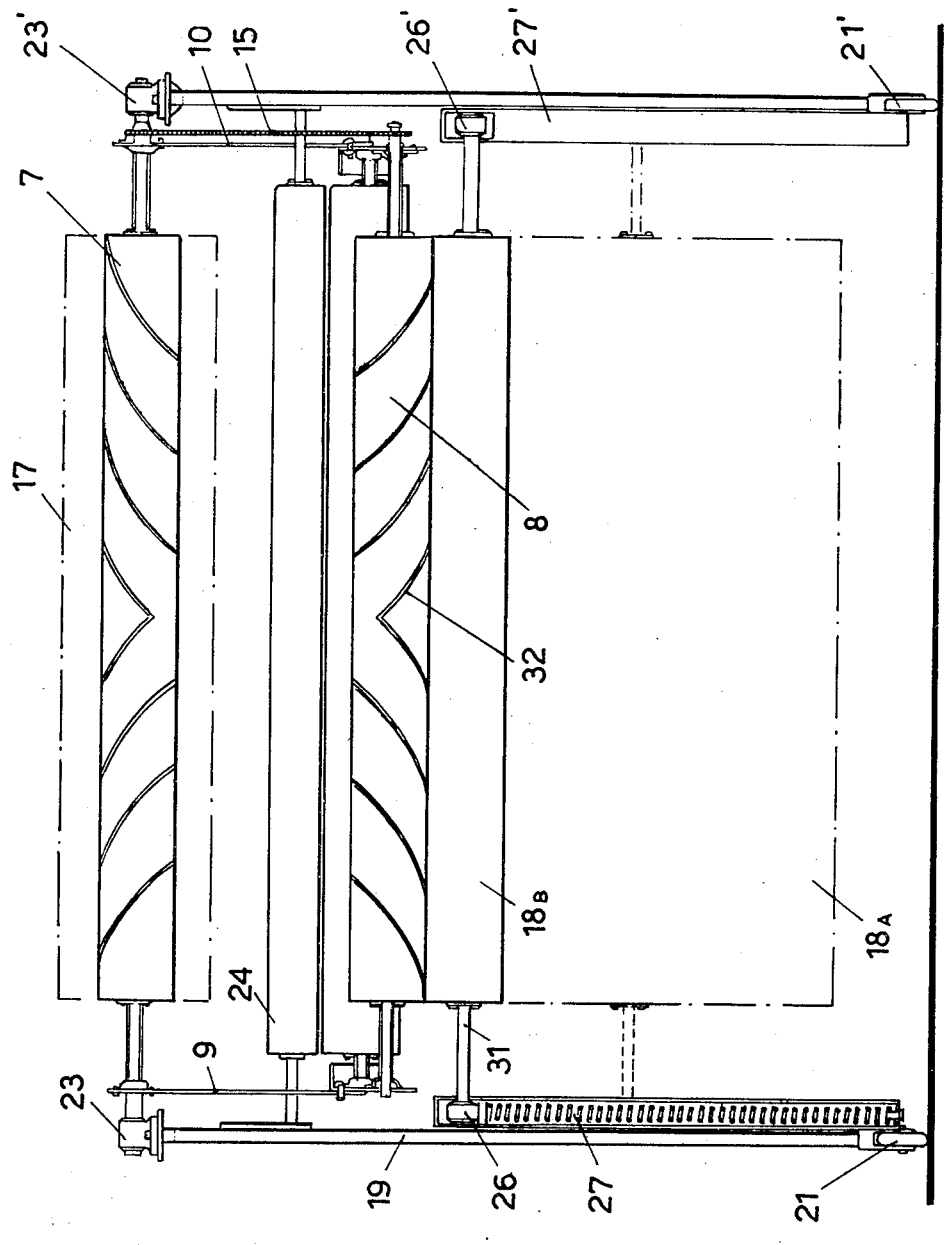

3,497,152
APPARATUS FOR TRANSPORTING HIDES AND/OR SKINS
Franco Ivaldi, Via Morghen 35, Turin, Italy
Filed Oct. 20, 1967, Ser. No. 676,911
Claims priority, application Italy, Oct. 22, 1966, 55,795/66
Int. Cl. B65h 17/02
U.S. Cl. 242—67.3      6 Claims

ABSTRACT OF THE DISCLOSURE

Animal hides and skins, which are generally handled manually during the various curing and pretanning operations, can be automatically handled by attaching to conventional conveyors a machine which permits the rolling of the hides and/or skins onto storage rolls, the storing of the hides thusly packed, the stopping, and the unrolling of the animal pieces for further processing. The device consists of a series of interrelated rolls, resting on a removable A-frame assembly.

---

The present invention is related to a method of and apparatus for the automatic handling, such as loading and unloading of animal hides and skins in machines conventionally employed in the various operations of the leather industry, such as curing and pretanning.

At present, in the leather industry, the various pretanning operations, whether carried out separately or on a continuous assembly line, call for manually loading and unloading of each operational machine. That is to say, an operator takes the hides or skins one by one from the delivery end of one machine and introduces them by hand to the feed inlet of a subsequent processing piece of apparatus. After the flaying, trimming and curing process, the hides and/or skins are sent to cold storage where they are sorted, packaged and prepared for forwarding to a tannery or other user.

It is, therefore, the main object of the present invention to provide a method and an apparatus for the automatic handling of the hides and skins with the ensuing savings in time and labor.

Another object of the invention is to provide a device which is of simple and sturdy construction and which permits the collection of the skins from the delivery end of any one machine of the processing cycle while maintaining the particular delivery arrangement.

It is a further object to provide means for the compact storage of the hides or skins on a single, transportable roll and permit the subsequent unrolling of the skins for conveyance to other apparatus, in a completely automated manner.

Other objects and advantages of the present invention will be apparent from the following detailed description thereof and from the accompanying drawings, in which:

FIGURE 2 is a front elevation of the same.

Figure 1:
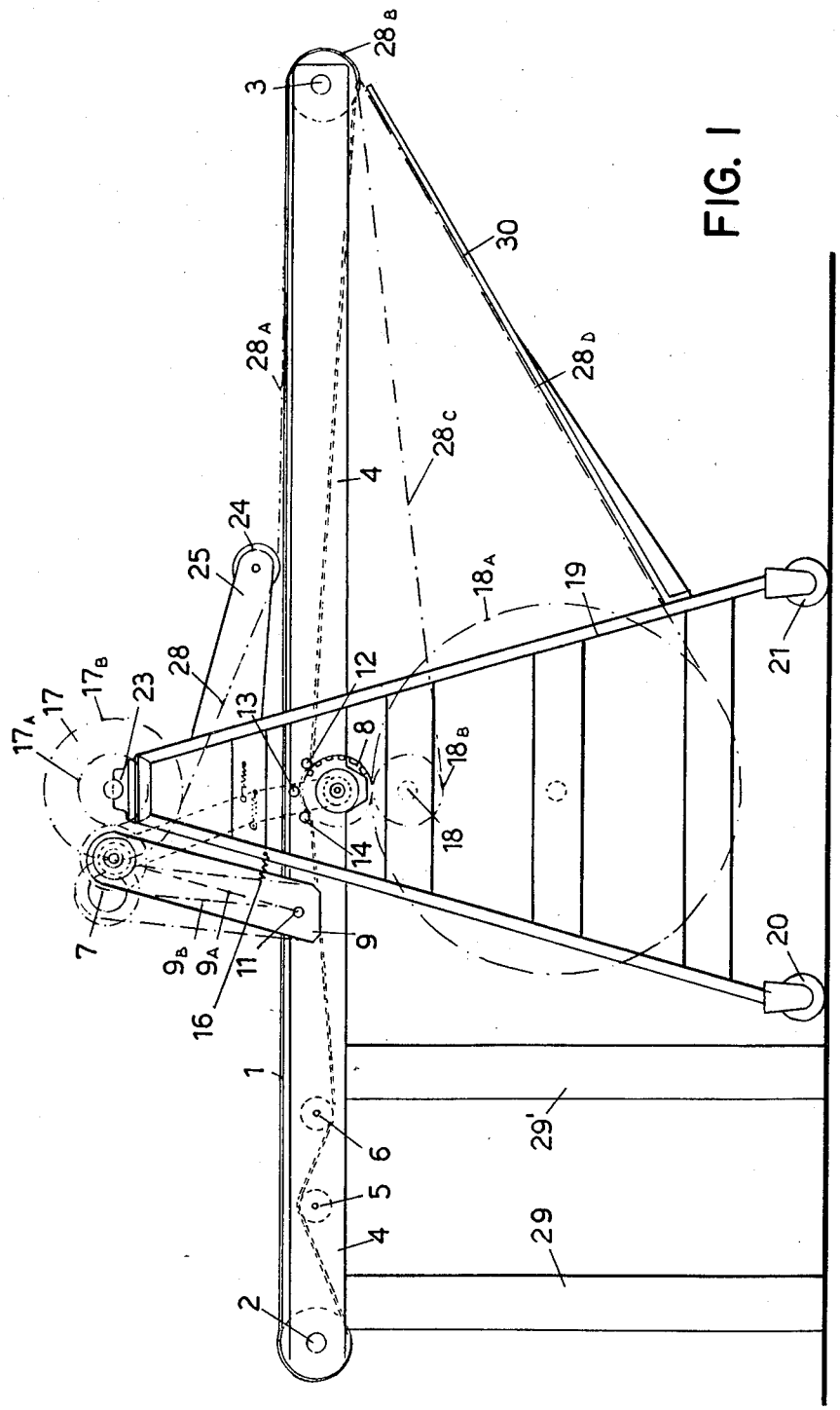
FIGURE 1 is a side view of the device according to the invention.

Briefly stated, the method, according to the present invention, comprises the steps of receiving the hides or skins from one machine, such as, for instance, a drier, a surface measurer, a continuous press on an endless belt conveyor; feeding the conveyed hides towards a second, flexible belt which unwinds from a first reel onto a second reel; and winding on said second reel the skins, together with said second flexible belt while maintaining the order of delivery of the skins.

The unwinding of said belt or flexible tape from the first reel is done in such a way, that the flexible material (transporting the skins) is caused to be wound with the skins about said second reel, which increases in diameter as more and more skins are wound on the reel.

The device which permits the carrying out of the method of the present invention comprises essentially an endless belt conveyor, preferably of flexible material, such as rubber, plastic or cloth, suitably stretched around two terminal, free-rotating cylinders; a metallic cantilever frame provided with two rollers and a pair of vertical supporting legs; an A-frame member on which there are provided two free-rotating transversal reels, one of which has a roll of tape wound thereon; and means for setting in motion the rollers and causing the winding and unwinding of a flexible tape from one transversal reel to the other.

The first of said rollers, mounted on a pair of pivotable supports on the cantilevered frame is placed above the skin-receiving conveyor belt and, by means of, for example, a spring connected to the vertical leg supports and the frame, is maintained in constant contact with one of the reels, round which is wound the roll of flexible tape material (preferably paper). The second roller, which, like the first one, is covered with a spongy, rubbery material for better traction, is mounted on the cantilevered frame underneath the conveyor belt and is pressed against said belt by three auxiliary rollers; this second roller is also in constant contact with the reel of the A-frame member onto which the tape (paper) winds. The rollers are further laterally connected to each other by a chain or other suitable transmission means for coordinated rotation.

Both reels are free-rotatingly mounted on the A-frame member which is positioned somewhat intermediate the terminals of the cantilevered frame and is provided with wheels for easy removal therefrom. The upper reel pivots on a fixed support of the A-frame member while the lower reel pivots on a support which is displaceable by the action of a spring, which tends to compress this reel upwardly.

The A-frame member is further provided with a pair of supporting arms which are connected to a tape- or paper-pressing roller and with a slanting support table for said tape.

Referring now to the drawings, an endless conveyor belt 1, preferably made of such flexible material as cloth, rubber or plastic, rotates about cylinders 2 and 3 mounted to the terminals of a frame 4. Frame 4 is cantilevered and is provided with a pair of supporting legs 29 and 29′. The conveyor belt 1 is maintained taut by means of two auxiliary rollers 5 and 6. The frame 4 supports also two friction rollers 7 and 8 which are free-rotatingly mounted with their axes parallel to cylinders 2 and 3 and are covered with spongy rubber strips 32 shaped as two symmetrical helices. Roller 7 is mounted on a pair of supports 9 and 10 pivotable on frame 4 by means of pins 11, and is placed above the surface of the belt 1. The other roller 8 is free-rotationally mounted on frame 4 underneath belt 1, against which it is pressed by three auxiliary rollers 12, 13, 14. The lower part of roller 8 is in contact with a reel 18 positioned parallel to cylinders 2 and 3. Rollers 7 and 8 are connected to each other through a chain 15 and are in contact with two reels 17 and 18 around which the flexible tape 28 may be wound. Roller 7 is kept in contact with reel 17 by a spring 16 which is fixed at an end to supporting arm 9, and at the opposite end, to frame 4; roller 8, on the other hand, contacts reel 18 freely. The reels 17 and 18 have parallel axes and, are mounted via supports 23, 23' and 26, 26' on an iron A-frame member 19, which is provided with wheels 20, 21, a slanting table 30 to support said sheet or tape 28 and a pair of arms 25 carrying a pressing roller 24, which is idly mounted with its axis parallel to reel 17. The flexible tape roll 28 is secured at both its terminals to the outer surfaces of reels 17 and 18 and is pressed by roller 24 against the belt 1, as shown at 28A. On movement, the tape 28, after contacting the belt 1 at 28A, bears at 28B against cylinder 3 and continues below the belt 1, as shown at 28C, before winding around reel 18.

The flexible tape 28 as it winds around reel 18 varies the diameter of the reel from a minimum indicated at 18B to a maximum indicated at 18A in FIGURE 1. Similarly, as it unwinds from reel 17, it varies the diameter of this reel from a maximum indicated at 17B to a minimum indicated at 17A.

When the reel diameter is at 17A, the support arm 9 takes position 9A, while when the reel diameter is at 17B support 9 is in position 9B. As the diameter of reel 18 increases, the position of its axis 31 is continuously lowered through supports 26, 26' against the action of springs 27, 27' which are in vertical compression. As a result of this increase in diameter of reel 18, the lower rectilinear section 28C of the tape 28 assumes position 28D.

The operation of the device of the present invention may be described as follows:

When hides or skins are to be unloaded from a piece of equipment such as, for example, from a drier, the cantilivered frame 4 is connected to the delivery terminal of said machine delivery so that the conveyor belt 1 will convey the articles from left to right by means of rollers 2 and 3.

Subsequently, the A-frame member 19 is positioned with wheels 20, 21 secured to the ground by means of clamps or other suitable means (not illustrated) and the lower reel 18, upwardly compressed by springs 27, 27' is brought into contact with the roller 7. Thus positioned, the A-frame member 19 allows the flexible tape 28, which may consist of paper, cloth or plastic material and which is wound around reel 17 and fixed with one terminal to reel 18, to contact gently the belt 1 (at 28A) by means of the pressing roller 24 and to wind itself around reel 18 following the course shown at 28C.

When belt 1 is set in motion either by suitable connection with the drier or by the action of an independent motor, it contacts during its endless travel friction roller 8 which is caused to rotate. Roller 8, in turn, causes the receiving reel 18, through friction of its helically wound rubber surface, and the roller 7, connected to roller 8 by the chain 15, to rotate. Roller 7, in turn, causes by friction the rotation of the upper reel 17. When the belt is running, it carries on its surface the hides or skins from the drier. After they have passed under roller 24, the skins come in contact with the flexible tape 28 at point 28A and, turning together with the tape around roller 3, descend through sloping section 28C and wind themselves together with the tape 28 around the receiving reel 18.

As the operation continues, the receiving reel 18 increases considerably in diameter until it reaches the size indicated at 18A, but by means of springs 27 and 28' the reel is constantly kept in contact with the friction roller 8 from which the reel receives its rotational motion. Concurrently, the upper reel 17 reduces progressively its diameter as, for instance, from position 17B to position 17A, while remaining constantly in contact, through spring 16, with the roller 7 from which its rotational motion is derived.

When the diameter of the receiving reel 18 reaches a predetermined size, for example, 18A, conveyor belt 1 is stopped and the member 19 is detached from the frame 4 which latter remains connected to the machine. Detachment of member 19 may be effected by uncoupling or by any other conventional operation known to a person skilled in the art. Member 19 is then removed and is replaced with another similar member provided with other fresh reels. The operation of the process is then resumed.

The reel 18 loaded with skins is now ready to be stored or passed to a subsequent finishing operation or may be forwarded directly to the tannery or to a shoe (after suitable packaging).

To load a machine from a rolled reel 18, the inverse operation is effected. The frame 4 is connected to the feed inlet of the machine so that the upper section of belt 1 might run from right to left; then, as in the preceding operation, an A-frame member 19 is positioned on the frame 4 and suitably locked thereto, the member having an empty receiving reel on the upper supports 23, 23' and a reel 18 containing thereon the tape and the skins, on the lower supports 26, 26'.

When the belt 1 is set in motion, it moves with its upper section from right to left and causes friction rollers 7 and 8 and reels 17 and 18 to rotate. Tape 28 unwinds itself and carries the skins along section 28D thus releasing them upon the conveyor belt 1 which conveys them to the machine feed inlet, while at the same time the tape 28 is wound around the empty receiving reel 17.

According to a preferred embodiment of the invention, frames 4 may be permanently connected to any machine, so long as they are provided with means required to lock astride thereof the A-frame members of the invention.

The belt 1 of the conveyor may be consisting of wood strips arranged side by side transversally and connected to one another.

Although the invention has ben described in terms of the preferred embodiment, variants and modifications may be made within the spirit and scope of the invention.

What is claimed is:

1. A device for winding and storing animal hides and skins which comprises: an endless conveyor belt maintained in substantially stretched position by two terminal cylinders; a cantilevered frame provided with supporting legs and carrying said belt; two friction rollers idly mounted on said frame with their longitudinal axes transversal to said belt and covered with friction material shaped superficially as a double helix; a first of said friction rollers being mounted on two parallel supports pivotably connected to said frame and being located above said conveyor belt; a first upper reel constantly contacting said first roller by means of a spring connected to said supports and to said frame; a second of said friction rollers being mounted on said frame underneath said belt and being in continuous contact with said belt by means of three auxiliary rollers; second lower reel continuously in contact with said second roller by means of a pair of compression springs; said rollers being connected to each other by a power transmission means; said reels being mounted on an A-frame member provided with wheels and with means for locking it in position intermediate and astride of said frame; a flexible tape fixedly secured at its terminals to the surfaces of said reels; and a pair of parallel arms in said A-framed member for supporting an idle pressing roller; and a sloping support table for said tape and mounted on said A-frame member.

2. A device according to claim 1, wherein said tape has sufficient strength to support said hides and/or skins and is composed of reusable material.

3. A device according to claim 1 wherein said conveyor belt is formed of wooden strips arranged side by side transversally and connected to one another.

4. A device according to claim 1 wherein said conveyor belt is kept in a stretched position by a plurality of auxiliary rollers located along its lower section and mounted on said frame.

5. A device according to claim 1 wherein said flexible tape connecting said reels is paper.

6. A device according to claim 1 wherein said reels are actuated by an independent, separate motor.

References Cited

UNITED STATES PATENTS

| | | | |
|---|---|---|---|
| 1,126,006 | 1/1915 | Harwood | 242—59 |
| 2,350,417 | 6/1944 | Ridings | 242—59 |
| 3,133,386 | 5/1964 | Johnston | 53—26 |

LEONARD D. CHRISTIAN, Primary Examiner

U.S. Cl. X.R.

56—26